United States Patent
Miyamoto et al.

(10) Patent No.: US 10,787,051 B2
(45) Date of Patent: Sep. 29, 2020

(54) COUPLING DEVICE, CARRIER, AND CARRYING SYSTEM

(71) Applicant: SHARP KABUSHIKI KAISHA, Sakai, Osaka (JP)

(72) Inventors: Takurou Miyamoto, Sakai (JP); Nobutoshi Tsujimoto, Sakai (JP); Fumihiro Matsuura, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/438,908

(22) Filed: Jun. 12, 2019

(65) Prior Publication Data
US 2019/0381843 A1    Dec. 19, 2019

(30) Foreign Application Priority Data
Jun. 13, 2018 (JP) .................. 2018-113071

(51) Int. Cl.
*B60D 1/02* (2006.01)
*B60D 1/36* (2006.01)
*G05D 1/02* (2020.01)
*B60D 1/00* (2006.01)

(52) U.S. Cl.
CPC ............... *B60D 1/025* (2013.01); *B60D 1/36* (2013.01); *B60D 2001/005* (2013.01); *G05D 1/021* (2013.01)

(58) Field of Classification Search
CPC . B61G 1/32; B61G 1/34; B60D 1/025; B60D 1/36; B60D 2001/005; B60D 1/02; G05D 1/021
See application file for complete search history.

(56) References Cited

U.S. PATENT DOCUMENTS

| | | | | |
|---|---|---|---|---|
| 1,382,896 A | * | 6/1921 | Eidmann ................... | B60D 1/02 280/498 |
| 1,398,575 A | * | 11/1921 | Ruggles .................. | B60D 1/465 280/477 |
| 1,565,112 A | * | 12/1925 | Sommer ................... | B60D 1/00 280/487 |
| 2,481,461 A | * | 9/1949 | Wolfrum ............... | A01D 67/005 280/508 |
| 3,180,657 A | * | 4/1965 | Molter, Sr. ............... | B60D 1/50 280/489 |
| 3,637,236 A | * | 1/1972 | Shimoji ................... | B60D 1/02 280/419 |
| 3,753,574 A | * | 8/1973 | Werle ....................... | B60D 1/02 280/479.2 |

(Continued)

FOREIGN PATENT DOCUMENTS

JP    2016-150691 A    8/2016

*Primary Examiner* — Erez Gurari
(74) *Attorney, Agent, or Firm* — ScienBiziP, P.C.

(57) ABSTRACT

A coupling device includes a coupling device body that includes a coupling pin. The coupling pin projects upward from the coupling device body. The coupling device body includes a support mechanism that supports the coupling pin so as to be freely movable in the direction of one line in a horizontal plane. The coupling device is included in the carrier. During coupling between the carrier and a carried object, the coupling pin is freely movable in the direction of at least one line in the horizontal plane and enabled to smoothly move to a position at which the coupling is performed.

10 Claims, 8 Drawing Sheets

(56) References Cited

U.S. PATENT DOCUMENTS

| | | | | |
|---|---|---|---|---|
| 4,593,840 A * | 6/1986 | Chown | ................... | B60R 9/06 |
| | | | | 224/484 |
| 4,863,179 A * | 9/1989 | Isaacs | ................... | B60D 1/00 |
| | | | | 280/33.996 |
| 5,009,446 A * | 4/1991 | Davis | ................... | B60D 1/40 |
| | | | | 280/477 |
| 5,183,284 A * | 2/1993 | Paplinski | ................ | B60D 1/02 |
| | | | | 280/435 |
| 5,213,354 A * | 5/1993 | Vaughn | ................... | B60D 1/40 |
| | | | | 280/477 |
| 5,350,077 A * | 9/1994 | Nezu | ..................... | B61G 1/283 |
| | | | | 180/168 |
| 5,898,961 A * | 5/1999 | Ambach | ................ | A61G 7/05 |
| | | | | 292/108 |
| 6,073,285 A * | 6/2000 | Ambach | ................ | A61G 7/05 |
| | | | | 292/252 |
| 6,076,847 A * | 6/2000 | Thornton | ................ | B60D 1/36 |
| | | | | 280/477 |
| 6,139,041 A * | 10/2000 | Murphy | ................... | B60D 1/36 |
| | | | | 280/477 |
| 6,481,739 B1 * | 11/2002 | Newkirk | ................ | A61G 7/05 |
| | | | | 267/69 |
| 6,874,807 B1 * | 4/2005 | Labadie | ................... | B60D 1/00 |
| | | | | 105/364 |
| 6,889,994 B1 * | 5/2005 | Birkenbaugh | ......... | B60D 1/155 |
| | | | | 280/479.2 |
| 7,374,197 B2 * | 5/2008 | Leverett | ................ | B60D 1/481 |
| | | | | 280/408 |
| 10,343,471 B1 * | 7/2019 | Anderson | ................ | B60D 1/36 |
| 2003/0132604 A1 * | 7/2003 | Evans | ................... | B62D 53/06 |
| | | | | 280/438.1 |
| 2004/0195803 A1 * | 10/2004 | Brown | ................... | B60D 1/481 |
| | | | | 280/504 |
| 2005/0206106 A1 * | 9/2005 | Labadie | ................... | B60D 1/44 |
| | | | | 280/79.11 |
| 2013/0320650 A1 * | 12/2013 | Grizzle | ................... | B60D 1/36 |
| | | | | 280/433 |
| 2019/0061446 A1 * | 2/2019 | Fujihara | ............... | B60D 1/1675 |
| 2019/0193495 A1 * | 6/2019 | Floyd | ................... | B60D 1/1675 |
| 2019/0202249 A1 * | 7/2019 | Adachi | ................ | B60D 1/36 |
| 2019/0381843 A1 * | 12/2019 | Miyamoto | ............ | B60D 1/02 |
| 2020/0016945 A1 * | 1/2020 | Ishimura | ................ | B60D 1/01 |
| 2020/0017296 A1 * | 1/2020 | Ishimura | ............... | B65G 47/962 |

* cited by examiner

COUPLING DEVICE, CARRIER, AND CARRYING SYSTEM

BACKGROUND

1. Field

The present disclosure relates to a coupling device configured to couple a carrier and a carried object to each other, and a carrier and a carrying system including the coupling device.

2. Description of the Related Art

There is an unmanned towing system that includes a combination of an unmanned towing vehicle capable of autonomously travelling along a preset route and a cart on which a work is loaded. The unmanned towing vehicle includes, in addition to a driving motor, a battery, and the like, a sensor configured to detect a guideline, such as a magnetic tape, disposed on a floor surface. The cart is coupled to the unmanned towing vehicle and is thereby enabled to move along a predetermined route.

For example, Japanese Unexamined Patent Application Publication No. 2016-150691 discloses an automatic carrying vehicle that includes a combination of a cart including universal wheels and a towing vehicle configured to be placed under and coupled to the cart. The towing vehicle includes a coupling pin for coupling the cart, a helical spring for urging the coupling pin in a coupling direction, and a projection restricting mechanism for restricting projection of the coupling pin. The cart has a bottom surface that includes a coupling hole for accommodating the coupling pin.

SUMMARY

In such a configuration of the towing vehicle described above, there is a possibility of coupling being not performed favorably, for example, when the coupling pin does not reach a correct position and is not inserted into the coupling hole or is inserted obliquely as a result of the towing vehicle inclining due to unevenness of a floor surface. Japanese Unexamined Patent Application Publication No. 2016-150691 discloses a feature of detecting presence/absence of the coupling pin at a coupling position by controlling a control unit and a feature of applying vibrations to the cart when the coupling pin is not detected. Meanwhile, the cart usually has a substantially heavy weight due to a carried object loaded thereon, and the towing vehicle also has a heavy weight. Therefore, even when a certain amount of vibrations are applied, the coupling pin may not move easily due to resistance acting, between the carrying cart and the towing vehicle having the heavy weights, with respect to the movement of the coupling pin. It is thus considered that the coupling pin may not be easily accommodated in the coupling hole.

The present disclosure is developed in consideration of the aforementioned circumstances. The present disclosure provides a coupling device that enables reliable coupling by smoothly guiding a coupling pin for coupling to a position for coupling to a carried object and also provides a carrier that includes the coupling device and that is configured to be coupled to a carried object, and a carrying system that uses the coupling device.

To achieve the above, according to the present disclosure, there is provided a coupling device that is included in a carrier and that is configured to couple the carrier and a carried object to each other, the coupling device including a coupling device body that includes a coupling pin. The coupling pin projects upward from the coupling device body and is freely movable in a direction of at least one line in a horizontal plane with respect to the coupling device body.

Being freely movable in the direction of one line means that being freely movable in the direction of one straight line that extends in the horizontal plane or in the direction of one curved line and indicates free movements, in addition to a movement in one direction, including movements in a reciprocating direction along the straight line or the curved line.

A carrier that includes the aforementioned coupling device is also included in the category of the technical concept of the present disclosure. In addition, a carrying system that includes a carrier including the aforementioned coupling device and that is configured to carry a carried object by using the carrier is also included in the category of the technical concept of the present disclosure.

DESCRIPTION OF THE EMBODIMENTS

Hereinafter, a coupling device, a carrier, and a carrying system according to an embodiment of the present disclosure will be described with reference to the drawings.

First Embodiment

Figure 1:
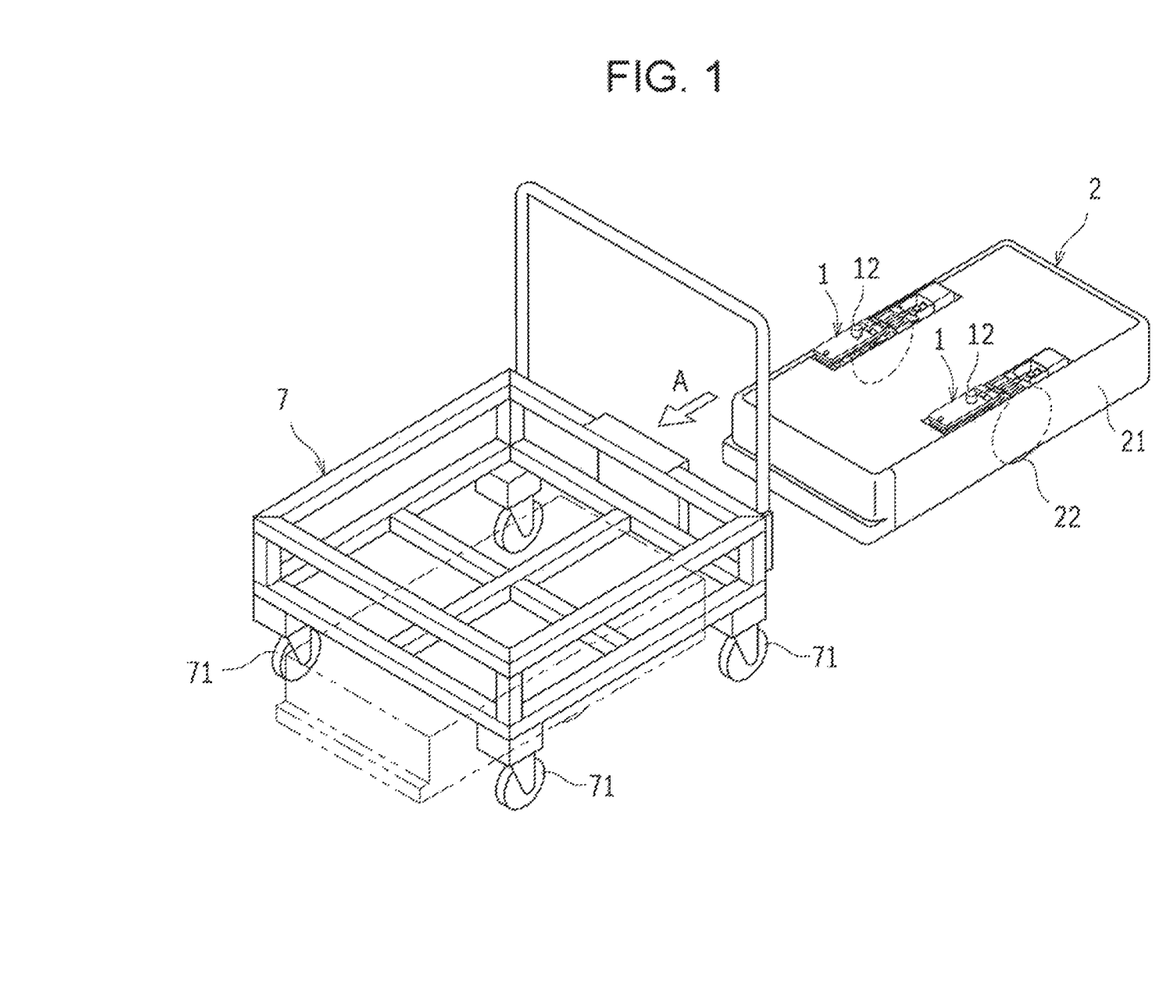
FIG. 1 is a perspective view illustrating a carrier and a carrying system according to a first embodiment of the present disclosure.
Figure 2:
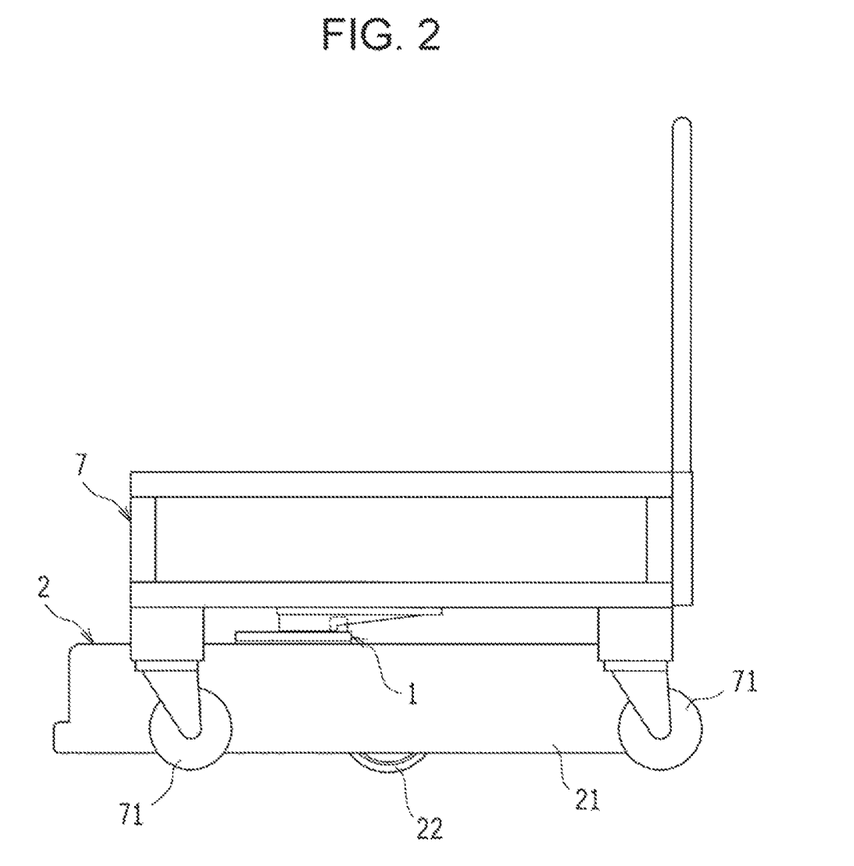
FIG. 2 is a side view illustrating the carrier and a carried object.

FIG. 1 to FIG. 6 each relate to a coupling device 1, and a carrier 2 and a carrying system including the coupling device 1 according to a first embodiment of the present disclosure. FIG. 1 is a perspective view illustrating the carrier 2 and the carrying system to which the coupling device 1 is applied. FIG. 2 is a side view illustrating the carrier 2 and a carried object 7.

As illustrated in FIG. 1, the carrying system according to the first embodiment includes the carrier 2, which is an unmanned towing vehicle configured to travel on a floor surface, and the carried object 7, such as a cart, configured to travel by being towed by the carrier 2. The carried object 7 is, for example, a cart for use in a warehouse or the like to carry in and out cargos and includes about four universal wheels 71. The carried object 7 is not limited to the illustrated cart and may have any configurations regarding the shape of the carried object 7, the number of the universal wheels, and the like.

The carrier 2 includes a body 21 designed to have a low floor. The carrier 2 has a structure that enables the body 21 to be placed between a floor surface and the bottom surface of the carried object 7 to perform coupling and towing of the carried object 7. For example, as illustrated in FIG. 1 and FIG. 2, the carrier 2 includes the body 21 that has a low-profile substantially rectangular parallelepiped shape that enables the body 21 to enter a space between the opposing universal wheels 71 of the carried object 7. The body 21 includes a left-right pair of driving wheels 22 configured to roll on a floor surface, driven wheels (not illustrated), and the like.

The left-right pair of driving wheels 22 are disposed in a direction so as to be parallel to each other. The direction in which these driving wheels 22 are disposed parallel to each other is the front-back direction of the carrier 2. The carrier 2 moves forward and backward when the rotating speeds of the left-right pair of driving wheels 22 are identical to each other, and turns and moves leftward and rightward depending on a difference between the rotating speeds when the rotating speeds of the left-right pair of driving wheels 22 differ from each other.

The body 21 of the carrier 2 includes the coupling device 1 for coupling the carried object 7 to the body 21 in a state of being placed under the carried object 7. The coupling device 1 includes a coupling device body 11 incorporated in the carrier 2 and is disposed on the upper surface side of the body 21.

In the embodiment illustrated in FIG. 1, the coupling device 1 is disposed to be partially exposed on the upper surface side of the body 21 of the carrier 2. The carrier 2 includes two coupling devices 1. The coupling devices 1 are each disposed along a respective one of two end portions of the body 21 in the width direction.

Coupling Device Body

Figure 3:
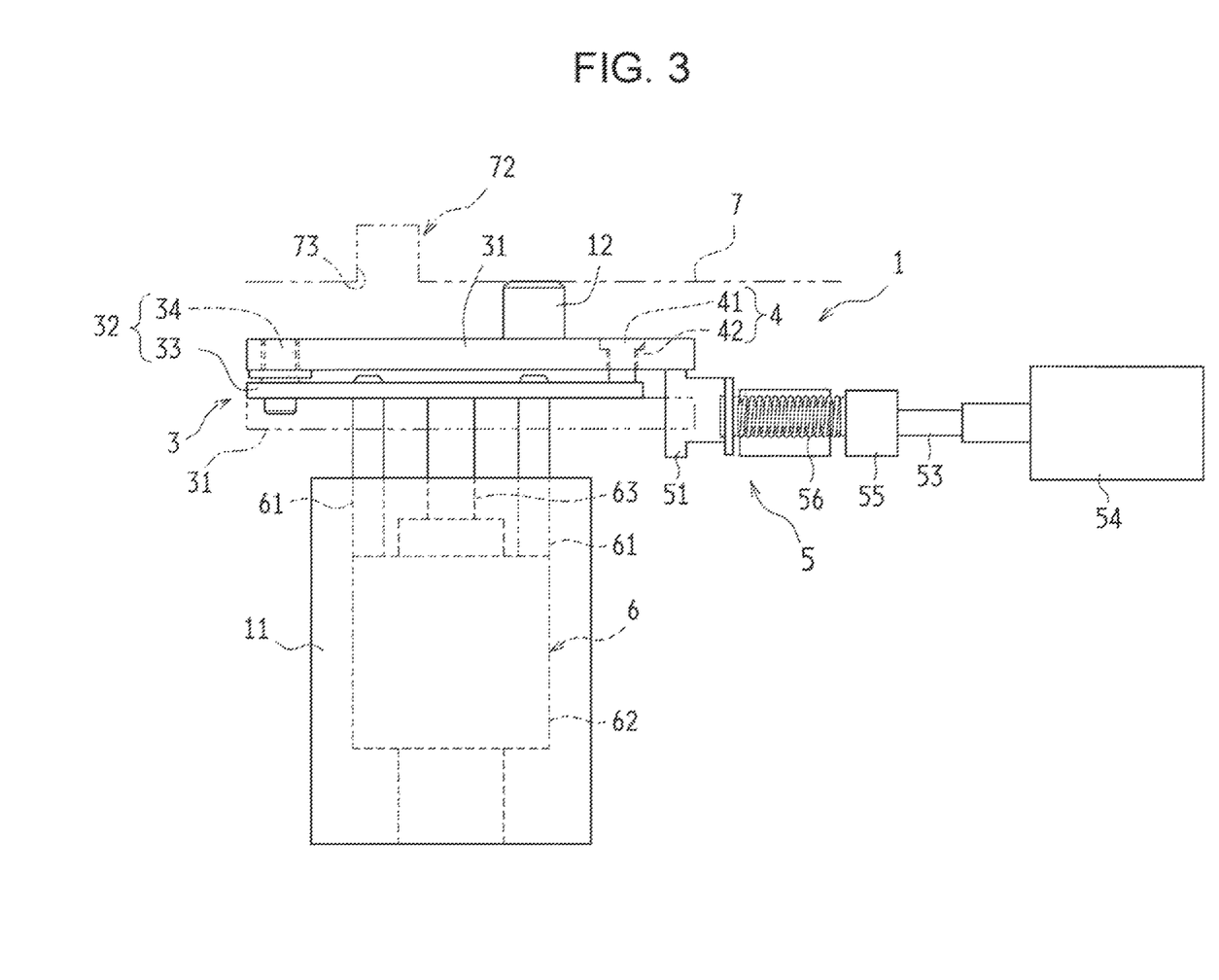
FIG. 3 is a side view illustrating a coupling device according to the first embodiment of the present disclosure.
Figure 4:
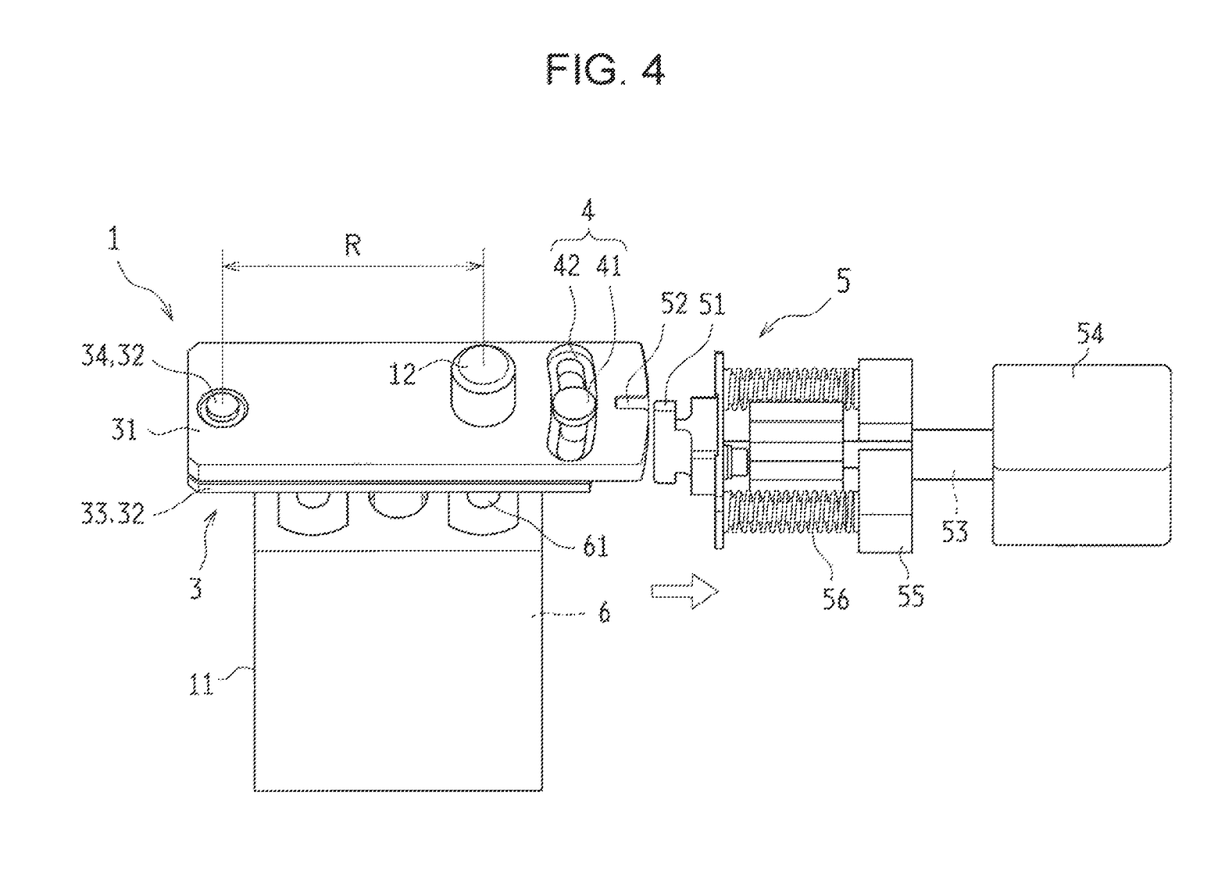
FIG. 4 is a perspective view illustrating the coupling device.

FIG. 3 is a side view illustrating the coupling device 1 included in the carrier 2. FIG. 4 is a perspective view of the coupling device 1. The coupling device 1 includes the coupling device body 11 that includes a coupling pin 12. The coupling device body 11 is provided with the coupling pin 12 and a support mechanism 3 that supports the coupling pin 12.

As illustrated in FIG. 3, the coupling pin 12 is supported from below by the support mechanism 3 and projects upward from the coupling device body 11. As the support mechanism 3, there are provided a support plate 31 and a rotatably support portion 32 that freely rotatably supports the support plate 31.

As illustrated in FIG. 4, the coupling pin 12 is erected on the upper surface of the support plate 31 and fixed to the support plate 31 so as to be integral therewith. The shape of the support plate 31 is not particularly limited. In the embodiment presented as an example, the support plate 31 is a substantially-rectangular plate-shaped member whose longitudinal direction is set in a direction orthogonal to the rotation axis of the driving wheels 22 of the carrier 2, that is, in the front-back direction of the carrier 2.

The support plate 31 is supported by the rotatably support portion 32 that includes a backing plate 33 and a rotary shaft 34. The backing plate 33 is disposed under the support plate 31 and supported by the coupling device body 11. As is the case with the support plate 31, the shape of the backing plate 33 is also not particularly limited. In the embodiment presented as an example, the backing plate 33 is a substantially-rectangular plate-shaped member. The backing plate 33 has a shape substantially identical to the shape of the support plate 31 and is disposed so as to overlap the support plate 31. The support plate 31 is supported on the backing plate 33 via the rotary shaft 34.

As illustrated in FIG. 4, the coupling pin 12 is disposed away from a center portion of the support plate 31 to be close to one end portion of the support plate 31 in the longitudinal direction. The rotary shaft 34 is disposed close to the other end portion of the support plate 31. Consequently, in a horizontal plane along the support plate 31 (and the backing plate 33), the rotary shaft 34 is disposed at a position away from the position of the coupling pin 12. The axes of the rotary shaft 34 and the coupling pin 12 are away from each other by a distance R.

The lower end portion of the rotary shaft 34 is fixed to the backing plate 33 while the upper end portion of the rotary shaft 34 is attached to the support plate 31 via a bearing or the like. The support plate 31 is provided so as to be rotatable above the backing plate 33 about the rotary shaft 34. The coupling pin 12 is supported by the support mechanism 3 including the rotary shaft 34 so as to be freely rotatable in the horizontal plane.

Due to the support plate 31 being rotatable about the rotary shaft 34, the coupling pin 12 is also supported together with the support plate 31 so as to be freely movable in the direction of one line in the horizontal plane. In this case, the coupling pin 12 is enabled to reciprocate in the direction of the arc of a circle having a radius R and having the rotary shaft 34 at the center thereof. The freely movable direction of the coupling pin 12 in the horizontal plane is substantially identical to a direction (left-right direction) perpendicular to the front-back direction of the carrier 2.

Restriction Member

The coupling device body 11 further includes a restriction member 4 configured to restrict the movement of the coupling pin 12 within a certain range in the direction of one line in the horizontal plane. In the embodiment presented as an example, as illustrated in FIG. 4, a restriction pin 41 that extends through the support plate 31 and a recessed groove 42 that guides the restriction pin 41 in the direction of the arc of the circle are provided as the restriction member 4.

The restriction pin 41 is erected on the upper surface of the backing plate 33. The recessed groove 42 is disposed close to one end portion of the support plate 31 in the longitudinal direction and provided as a substantially-arc-shaped long hole that extends through the support plate 31. The restriction pin 41 is inserted into the recessed groove 42 and is slidable along the recessed groove 42.

Figure 5:
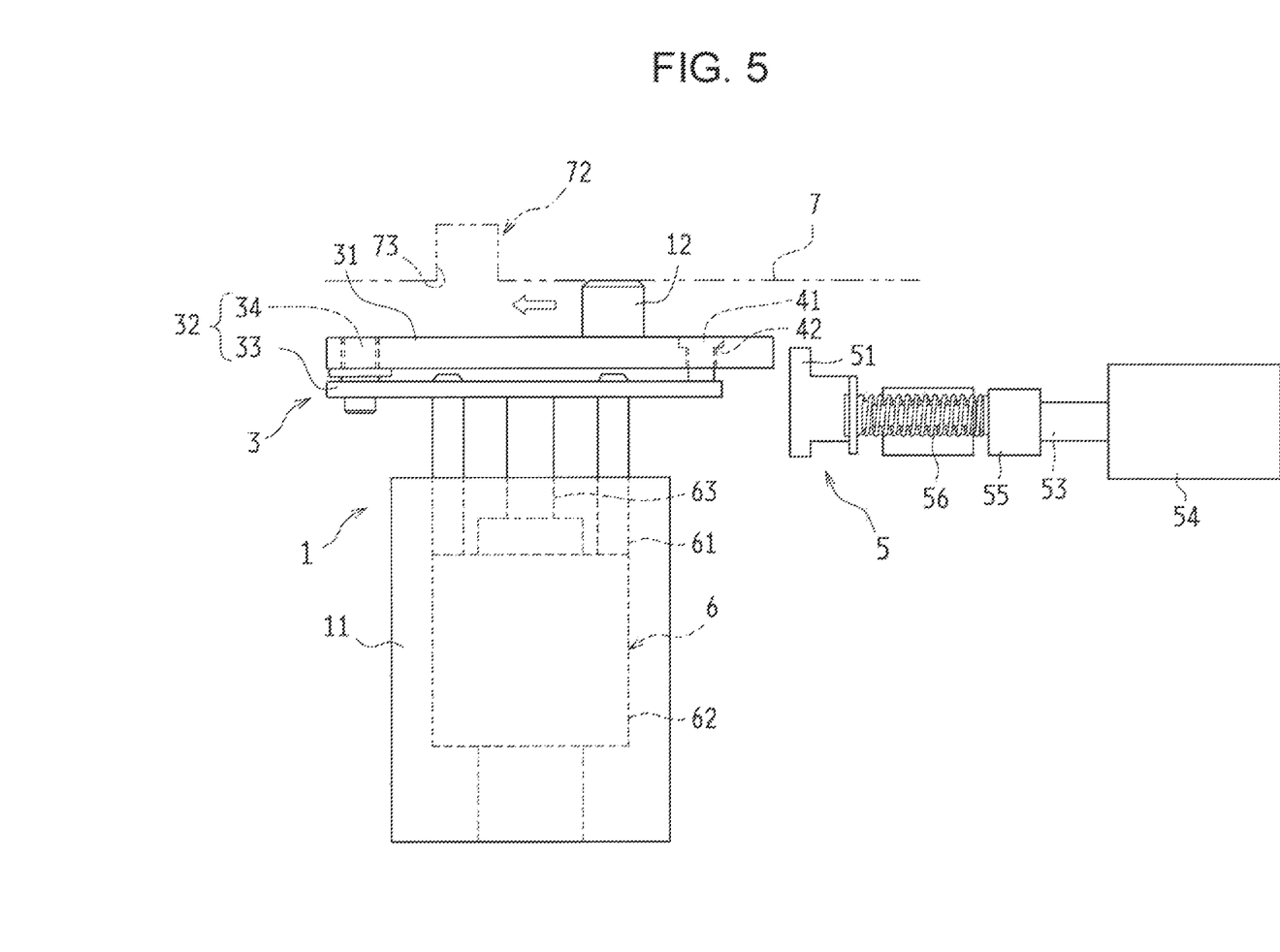
FIG. 5 is a side view illustrating an operation of the coupling device.
Figure 6:
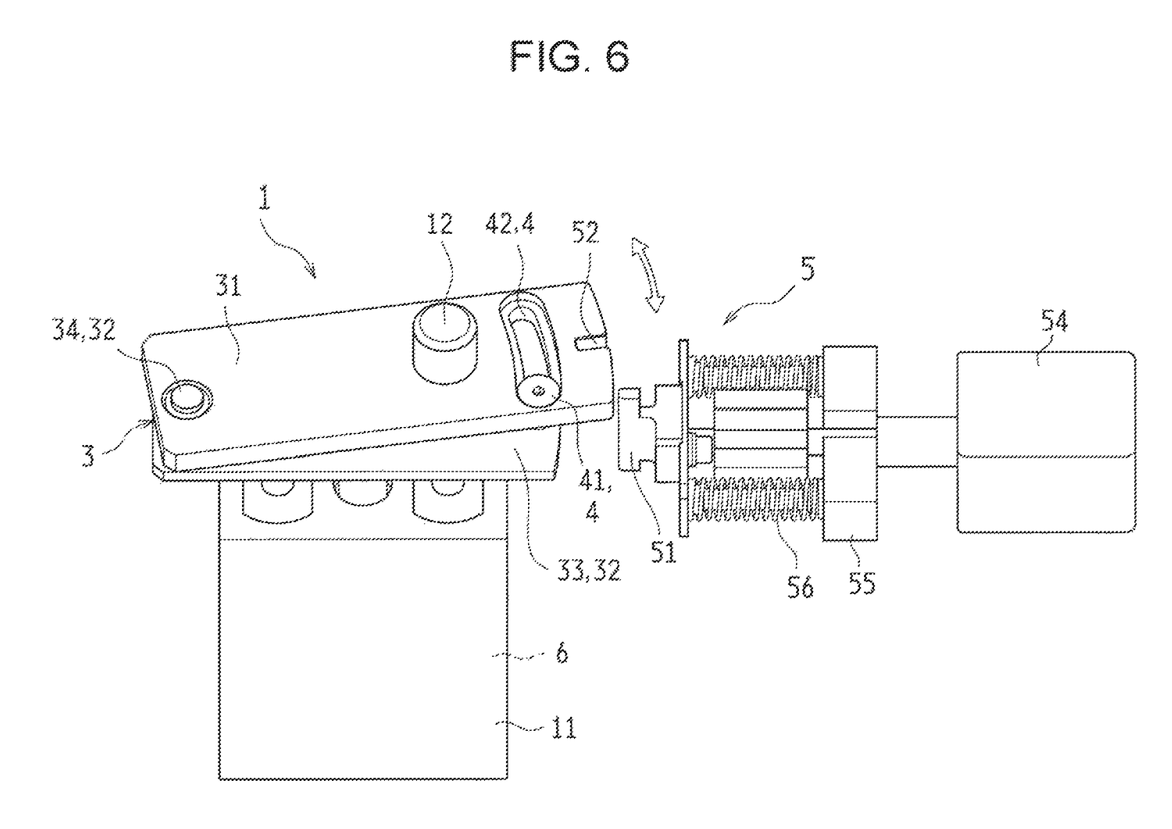
FIG. 6 is a perspective view illustrating an operation of the coupling device.

FIG. 5 is a side view illustrating a state in which the coupling pin 12 is freely movable in the coupling device 1. FIG. 6 is a perspective view illustrating a rotating state of the support plate 31. Specifically, the restriction pin 41, as the restriction member 4, includes a head portion and an external thread portion. Corresponding to this, the recessed groove 42 includes, inside the groove, a step portion for receiving the head portion. The restriction pin 41 is screwed into the backing plate 33 through the recessed groove 42 and thereby joined to and erected on the backing plate 33.

As illustrated in FIG. 4 and FIG. 6, when the support plate 31 rotates about the rotary shaft 34, the restriction pin 41 erected on the backing plate 33 restricts the range of the rotation of the support plate 31 within the range inside the groove of the recessed groove 42. The coupling pin 12 erected on the support plate 31 is movable in the direction of the arc of the circle having the rotary shaft 34 at the center thereof. The movement of the coupling pin 12 is restricted by the restriction member 4 to be within the range of the recessed groove 42.

Lock Mechanism

The movement of the coupling pin 12 erected on the support plate 31 is switched between a fixed state and a movable state by a lock mechanism 5 included in the coupling device body 11. In other words, the lock mechanism 5 is configured to switch the movable state in which the coupling pin 12 is freely movable within the range of the recessed groove 42 and the fixed state in which the free movement of the coupling pin 12 is inhibit.

As illustrated in FIG. 4, the coupling device 1 includes, as the lock mechanism 5, an engaging member 51 capable of moving forward and backward with respect to the support plate 31, and an engaged portion 52 with which the engaging member 51 is engaged. The engaged portion 52 is disposed in the support plate 31.

The engaging member 51 is disposed so as to be movable forward and backward with respect to the support plate 31 via a suitable driving means, such as an actuator. As a driving means, a solenoid 54 including a forward-backward moving rod 53 that is configured to move forward and backward in response to excitation of a coil is coupled to the engaging member 51, as an example. The forward-backward moving rod 53 is driven to move forward and backward in response to energization of the solenoid 54 and moves the engaging member 51 to a forwardly moved position or a backwardly moved position.

FIG. 3 illustrates the engaging member 51 at the forwardly moved position. The engaging member 51 is engaged with the engaged portion 52 disposed in the support plate 31. The support plate 31 is fixed (in the fixed state) above the backing plate 33 with the movement of the support plate 31 being inhibited by the engaging member 51.

FIG. 4 and FIG. 5 each illustrate the engaging member 51 at the backwardly moved position. The forward-backward moving rod 53 is moved backward as a result of the solenoid 54 being energized, and the engaging member 51 is disengaged from the engaged portion 52. The support plate 31 is in a state (in the movable state) of being freely movable about the rotary shaft 34. When energization of the solenoid 54 is stopped, the forward-backward moving rod 53 performs a forward movement, and the engaging member 51 is engaged again with the engaged portion 52.

The lock mechanism 5 may have any configuration for the support plate 31, and the arrangement, form thereof is not limited to that presented as an example. In the illustrated embodiment, the engaged portion 52 is disposed at an end portion of the support plate 31 on a side opposite to the rotary shaft 34. The engaged portion 52 and the rotary shaft 34 are disposed on the same axis of the support plate 31. On an extension axis of the axis, the engaging member 51 and the forward-backward moving rod 53 are disposed. The engaged portion 52 is a notched groove that extends in the direction of the axis. The engaging member 51 is a projection configured to be fitted into the engaged portion 52 and has a configuration that enables easy engagement.

The lock mechanism 5 includes a vertical wall 55 disposed between the engaging member 51 and the solenoid 54 and includes a return spring 56 in a compressed state between the vertical wall 55 and the engaging member 51. The return spring 56 acts as a buffer when the engaging member 51 is moved to the forwardly moved position and the backwardly moved position.

As a result of the lock mechanism 5 being thus driven, the engaging member 51 moves forward and backward with respect to the engaged portion 52 and can cause the support plate 31 to enter a rotatable state or a non-rotatable state.

Lifting Mechanism

As described above, the carrier 2 is coupled in a state of being placed under the carried object 7 to the carried object 7 by the coupling devices 1. Thus, a lifting mechanism 6 configured to lift the coupling pin 12 when coupling to the carried object 7 is performed is accommodated in the coupling device body 11.

The lifting mechanism 6 has a function of moving upward and downward the support plate 31 including the coupling pin 12, together with the backing plate 33. As the lifting mechanism 6, for example, in the embodiment illustrated in FIG. 3, there are provided a lifting member 61 disposed under the backing plate 33 and a cylinder device 62 configured to move upward and downward the backing plate 33 via the lifting member 61. A spring member 63 configured to urge the coupling pin 12 in a projecting direction (lifting direction) via the backing plate 33 and the support plate 31 may be disposed on the bottom surface of the backing plate 33.

As a result of being fixed to the body 21 of the carrier 2, the lifting mechanism 6 is configured to cause the coupling pin 12 to project upward from the upper surface of the body 21 and to move the coupling pin 12 upward and downward. The lifting mechanism 6 is fixed to the coupling device body 11 and is not freely movable in the direction of one line in the horizontal plane. The backing plate 33 is disposed at an upper end portion of the lifting mechanism 6. The support plate 31 and the coupling pin 12 disposed on the upper surface of the support plate 31 are further disposed on the backing plate 33. As described above, the support plate 31 is provided to be rotatable above the backing plate 33 about the rotary shaft 34, and the coupling pin 12 is enabled to reciprocate together with the support plate 31 in the direction of the arc of the circle having the radius R and having the rotary shaft 34 at the center thereof in the horizontal plane. Consequently, the coupling pin 12 is freely movable in the direction (the direction of the arc of the circle in the embodiment illustrated as an example) of one line in the horizontal plane with respect to the lifting mechanism 6.

In the structure according to the present embodiment, the coupling pin 12 is supported so as to be freely movable in the direction of one line in the horizontal plane by the support mechanism 3 with respect to an upper end portion that is lifted and lowered by the lifting mechanism 6. Consequently, it is possible to freely move only the coupling pin 12, which is a lightweight portion, in the direction of one line in the horizontal plane while fixing the lifting mechanism 6, which has a heavy weight, to the coupling device body 11. Accordingly, it is possible to simplify the structure of the coupling device 1, compared with a structure in which, for example, the lifting mechanism 6 is also freely moved in the horizontal direction together with the coupling pin 12, which enables an improvement in freely movable performance of the coupling pin 12 in the horizontal plane.

Coupling Operation

Next, an operation of coupling between the carrier 2 and the carried object 7 by using the coupling devices 1 will be described. As illustrated in FIG. 1, the coupling devices 1 are provided in the body 21 of the carrier 2 so as to be integral therewith. The carried object 7 waits at a predetermined position in a stopped state with a cargo or the like loaded thereon. As illustrated in FIG. 3, a coupling hole 73 into which the coupling pin 12 is to be fitted is disposed as a connected portion 72 in the bottom surface of the carried object 7.

To couple the carrier 2 and the carried object 7, the carrier 2 performs a forward movement in a state of being placed between a floor surface and the bottom surface of the carried object 7. The backing plate 33 and the support plate 31 of the coupling device 1 are at a lowered position, which is an initial state, and the engaging member 51 at the forwardly moved position is engaged with and fixed to the support plate 31. The coupling pin 12 is moved in the fixed state without coming into contact with the bottom surface of the carried object 7.

When the carrier 2 has moved forward between the carried object 7 and the floor surface to a predetermined position, the lifting mechanism 6 is driven, and the backing plate 33 is lifted. Consequently, as illustrated in FIG. 3, the support plate 31 and the coupling pin 12 are lifted and enter a state of being pressed against the bottom surface of the carried object 7 by being urged by the spring member 63. At this time, the engaging member 51 of the lock mechanism 5 is at the forwardly moved position and engages the engaged portion 52 of the support plate 31, and the coupling pin 12 is in the fixed state.

Next, a switching operation of the lock mechanism 5 is performed, and, as illustrated in FIG. 4, the engaging member 51 is moved to the backwardly moved position. Consequently, the engaging member 51 is disengaged from the engaged portion 52 of the support plate 31. The coupling pin 12 enters the movable state, which enables free movement thereof.

As a result of the carrier 2 that includes the coupling devices 1 performing a forward movement in this state, the coupling pin 12 approaches the connected portion 72, as illustrated in FIG. 5. When the coupling pin 12 reaches the position of the coupling hole 73, the coupling pin 12 urged in the projecting direction is fitted into the coupling hole 73. Consequently, the carried object 7 and the carrier 2 are coupled to each other and enabled to travel together on the floor surface.

After the carrier 2 and the carried object 7 are coupled to each other, the engaging member 51 is moved to the forwardly moved position and engaged with the engaged portion 52 by the lock mechanism 5, and the coupling pin 12 enters the fixed state again. Due to the coupling pin 12 being inhibited from freely moving, the coupled state of the carrier 2 and the carried object 7 is stably kept favorable.

Here, it is supposed that there is a possibility of a slight positional displacement being generated between the coupling pin 12 and the coupling hole 73 due to unevenness of the floor surface or the like while the coupling pin 12 moves forward to the position of the coupling hole 73. As described above, in the coupling device 1, the fixed state of the coupling pin 12 is cancelled by the lock mechanism 5 when the coupling pin 12 moves forward toward the connected portion 72. Consequently, the coupling pin 12 enters a state of being freely movable in the direction of the arc of the circle, the direction intersecting the forward-movement direction of the carrier 2 (refer to FIG. 6).

As illustrated in FIG. 5, even when a slight positional displacement is generated between the coupling pin 12 and the coupling hole 73, the coupling pin 12 that is urged in the projecting direction and that performs a forward movement while being pressed against the bottom surface of the carried object 7 naturally moves to a correct position as a result of a leading end portion of the coupling pin 12 coming into contact with the coupling hole 73. Accordingly, even in such a case, the coupling pin 12 is accommodated in the coupling hole 73 smoothly.

The carried object 7 is detached from the carrier 2 when carried to a destination by the carrier 2. The coupling device 1 lowers the coupling pin 12 by using the lifting mechanisms 6 to detach the coupling pin 12 from the coupling hole 73. Consequently, coupling between the carrier 2 and the carried object 7 is cancelled. In the coupling device 1, the coupling pin 12 is suppressed, at a location from a position for coupling to the carried object 7 to a position at which coupling is cancelled, from being detached from the coupling hole 73 due to the coupling pin 12 being in the fixed state caused by the action of the lock mechanism 5.

Thus, the carrier 2 including the coupling devices 1 and the carrying system are enabled to favorably carry the carried object 7 without a complex control system and the like due to the coupling pins 12 of the coupling devices 1 being coupled to the carried object 7 smoothly. Moreover, the stable coupled state of the coupling pin 12 is kept also during carrying of the carried object 7, which enables reliable carrying of the carried object 7 to a destination.

In the coupling device 1 according to the present embodiment, driving of the lifting mechanism 6 and the lock mechanism 5 are electrically controlled by a controller (not illustrated) included in the body 21 of the carrier 2. The configuration of the lifting mechanisms 6 and the lock mechanism 5 is not limited to the embodiment presented as an example and may have a configuration in which, for example, a driving motor or the like is employed as the lifting mechanism 6 as an alternative to the cylinder device 62. In addition, although an example in which, after the coupling pin 12 is lifted by the lifting mechanism 6, the lock mechanism 5 is cancelled to cause the coupling pin 12 to enter the movable state has been described, a configuration in which, after the coupling pin 12 is caused by the lock mechanism 5 to enter the movable state, the coupling pin 12 is lifted by the lifting mechanism 6 may be employed.

The direction of a line along which the coupling pin 12 is freely movable may be any directions, including straight directions and curved directions, provided that the directions intersect the travelling direction of the carrier 2 in the horizontal plane and may be the directions of a plurality of lines, not limited to the direction of one line. The coupling structure is not limited to the coupling pin 12 and the coupling hole 73. The shape of the coupling pin 12, the connected portion 72 coupled to the coupling pin 12, and the like may have any configurations.

Second Embodiment

Next, the coupling device 1, and the carrier 2 and a carrying system that include the coupling device 1 according to a second embodiment of the present disclosure will be described with reference to the drawings. This embodiment has a feature of further including a guide mechanism 8 of the coupling pin 12 in addition to the configuration described in the first embodiment. Other configurations of this embodiment are common to the first embodiment. Thus, the common configurations will be described using signs common to the first embodiment, and detailed description will be provided mainly for the guide mechanism 8.

Figure 7A:
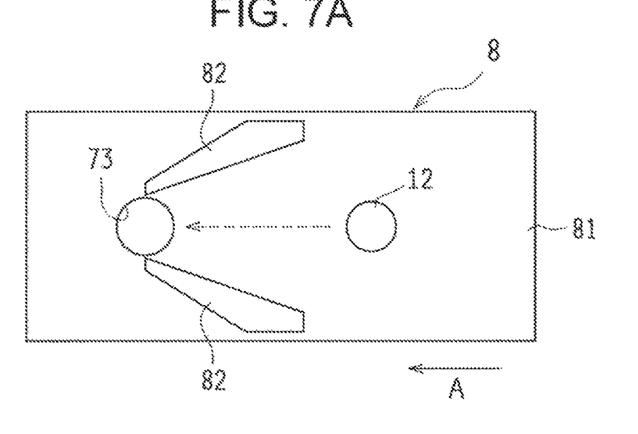
FIGS. 7A, 7B, and 7C each describe a guide mechanism in the coupling device and the carrier according to a second embodiment of the present disclosure.
Figure 7B:
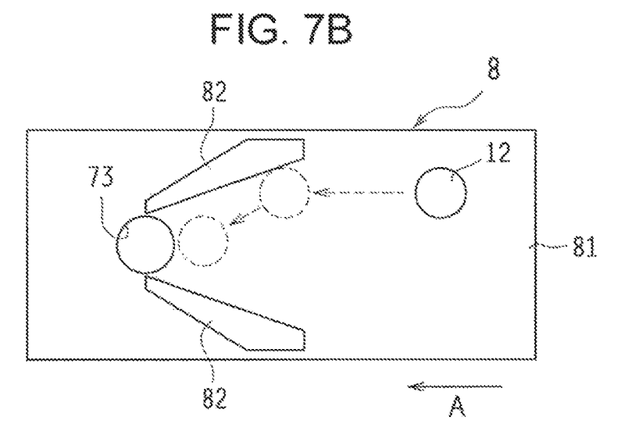
Figure 7C:
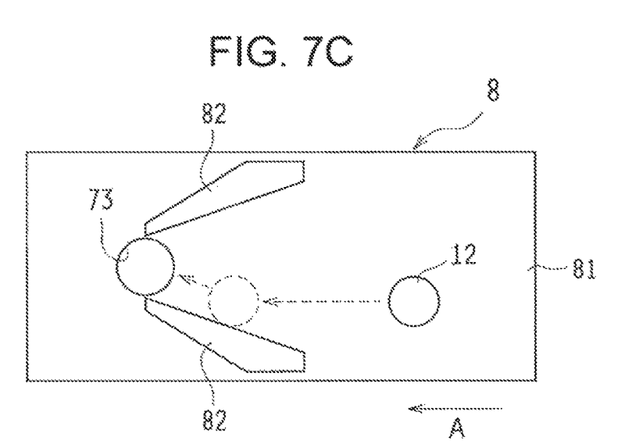
Figure 8:
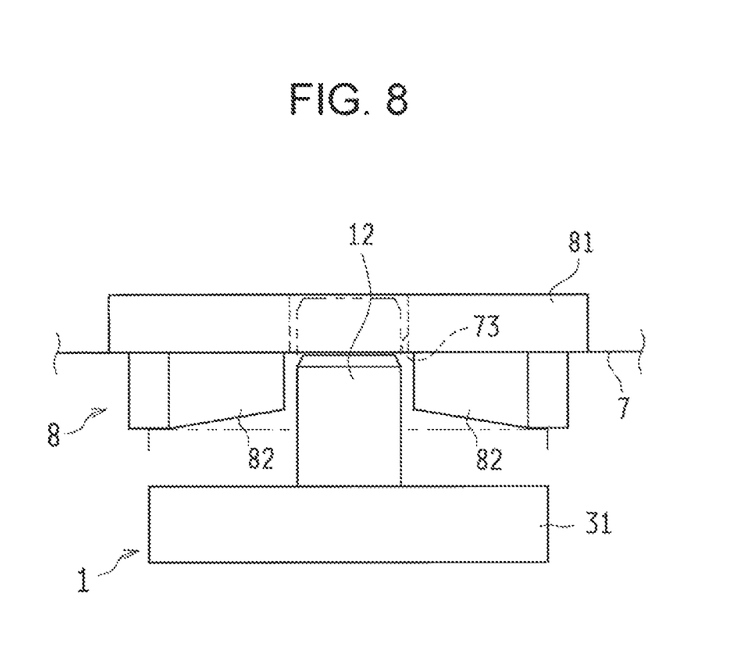
FIG. 8 describes the guide mechanism viewed from the back in a travelling direction of the carrier.

FIGS. 7A, 7B, and 7C each describe the guide mechanism 8 in the coupling device 1, and the carrier 2 and the carrying system that include the coupling device 1 according to the second embodiment. FIGS. 7A, 7B, and 7C each illustrate the guide mechanism 8 with the bottom surface side of the carried object 7 viewed from below. FIG. 8 describes the guide mechanism 8 viewed from the back in the travelling direction of the carrier 2.

As the carrying system, the guide mechanism 8 that guides the coupling pin 12 to the coupling hole 73 is disposed at the bottom surface of the carried object 7. The guide mechanism 8 is included in, for example, a rectangular connection plate 81, such as that illustrated in FIG. 7A. The connection plate 81 includes the coupling hole 73 for accommodating the coupling pin 12 and is attached to the bottom surface of the carried object 7 so as to be integral therewith.

The guide mechanism 8 includes a pair of guide walls 82 that project downward from the connection plate 81. As illustrated in FIG. 7A, the guide walls 82 are projections elongated along a travelling direction (A) of the carrier 2. One end portion of each of the guide walls 82 is disposed close to the coupling hole 73, and another end portion thereof is extended to a portion close to an edge of the connection plate 81. As illustrated in FIG. 8, these guide walls 82 vertically extend downward from the lower surface of the connection plate 81.

Consequently, the pair of guide walls 82 are disposed in a substantially V-shape such that a distance between inner wall surfaces thereof facing each other decreases toward the coupling hole 73. In other words, one end portions of the guide walls 82 are disposed close to each other so as to correspond to the opening width of the coupling hole 73. Other end portions of the guide walls 82 are spaced from each other and disposed such that a distance therebetween increases toward an opposite side in the travelling direction (A). The depth of the coupling hole 73 and the projecting amount of the guide walls 82 are provided so as to correspond to the length of the coupling pin 12 in the axial direction.

As illustrated in FIG. 5, the coupling pin 12 approaches the coupling hole 73 as a result of the carrier 2 performing a forward movement during coupling to the carried object 7. As illustrated in FIG. 7A, the coupling pin 12 moves between the pair of guide walls 82 and reaches the coupling hole 73. As illustrated in FIG. 8, due to the coupling pin 12 being urged in the projecting direction, the coupling pin 12 is fitted into the coupling hole 73 smoothly when reaching the coupling hole 73.

Tentatively, it is supposed that the coupling pin 12 and the coupling hole 73 are not positioned on the same straight line in the travelling direction (A). In this case, as illustrated in FIG. 7B and FIG. 7C, as a result of the forward movement of the carrier 2, the coupling pin 12 comes into contact with one of the guide walls 82.

Here, as illustrated in FIG. 6, the coupling pin 12 is restricted by the restriction member 4 to be in a state (movable state) of being freely movable in the direction of the arc of the circle. Thus, the coupling pin 12 that has come into contact with the guide wall 82 continues to move obliquely forward along the guide wall 82. The support plate 31 including the coupling pin 12 rotates about the rotary shaft 34 and allows the coupling pin 12 to move along the guide wall 82. As a result, the coupling pin 12 is guided to the coupling hole 73 while freely moving between the pair of guide walls 82 by receiving a force from the guide mechanism 8. The coupling pin 12 that has reached the coupling hole 73 is fitted into the coupling hole 73 smoothly.

As described above, the coupling device 1, the carrier 2, and the carrying system according to the present embodiment are enabled to accurately couple the carrier 2 and the carried object 7 to each other because the coupling pin 12 in the movable state is smoothly guided to the coupling hole 73, even during coupling between the carried object 7 and the carrier 2 that have heavy weights, due to the provision of the guide mechanism 8.

In the guide mechanism 8, a guiding member for guiding the coupling pin 12 to the connected portion 72 is not limited to the aforementioned pair of guide walls 82. Moreover, the arrangement form thereof is also not limited to the aforementioned substantially V-shape. The guiding member may have any configuration and may be, for example, an inclined surface or a curved portion provided on the connection plate 81.

Other Embodiment

The coupling device 1, and the carrier 2 and the carrying system that include the coupling device 1 according to the present disclosure are not limited to the configurations described in the aforementioned first and second embodiments and may be embodied in various forms.

For example, in the coupling device 1, the configuration of the support mechanism 3 that supports the coupling pin 12 is not limited to the configuration that includes the support plate 31 and the rotatably support portion 32 that freely rotatably supports the support plate 31 and may be a configuration that includes a slide support portion that freely slidably supports the coupling pin 12 in the horizontal plane.

In this case, the support plate 31 on which the coupling pin 12 is erected is freely slidably supported via a slide rail or the like disposed in a direction that intersects the travelling direction of the carrier 2 and freely moves in parallel in the horizontal plane. Moreover, the coupling pin 12 may not be erected on the support plate 31, and the coupling pin 12 may be freely slidably supported directly or indirectly by the slide support portion. The support mechanism 3 having such a configuration is also enabled to guide the coupling pin 12 smoothly to the connected portion 72, as is the case with the aforementioned embodiments, and to favorably couple the carrier 2 and the carried object 7 to each other.

As the support mechanism 3, a two-axis movement stage or the like may be used, and the coupling pin 12 may be provided so as to be freely movable in the directions of a plurality of lines in the horizontal plane.

The present disclosure is not limited to the aforementioned embodiments and may be variously modified within the range indicated in the claims. Embodiments that are obtained by combining, as appropriate, the technical matters indicated in the different embodiments are also included in the technical range of the present disclosure. Therefore, the aforementioned embodiments are indicated as non-limiting examples.

The present disclosure contains subject matter related to that disclosed in Japanese Priority Patent Application JP 2018-113071 filed in the Japan Patent Office on Jun. 13, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A coupling device that is included in a carrier and that is configured to couple the carrier and a carried object to each other, the coupling device comprising:
   a coupling device body that includes a coupling pin,
   wherein the coupling pin projects upward from the coupling device body and is freely movable in a direction of at least one line in a horizontal plane with respect to the coupling device body,
   wherein the coupling device body includes a lock mechanism that switches between a movable state in which the coupling pin is freely movable and a fixed state in which movement of the coupling pin is inhibited, and wherein the lock mechanism causes the coupling pin to enter the movable state during coupling between the carrier and the carried object and keeps the coupling pin in the fixed state after the coupling between the carrier and the carried object.

2. The coupling device according to claim 1, wherein the coupling device body includes a support mechanism that supports the coupling pin so as to be freely movable in a direction of one line in the horizontal plane.

3. The coupling device according to claim 2, wherein the support mechanism includes
   a support plate on which the coupling pin is erected, and
   a rotatably support portion that includes a rotary shaft and that supports the support plate
so as to be freely rotatable about the rotary shaft in the horizontal plane,
wherein the rotary shaft is disposed in the horizontal plane so as to be spaced from a position at which the coupling pin is erected, and
wherein the coupling pin is rotatable about the rotary shaft.

4. The coupling device according to claim 2, wherein the support mechanism includes a slide support portion that supports the coupling pin so as to be freely slidable in the horizontal plane.

5. The coupling device according to claim 1, wherein the coupling device body includes a restriction member that restricts movement of the coupling pin within a certain range in the direction of the line.

6. A carrier comprising:
the coupling device according to claim 1.

7. A carrying system comprising:
a carrier that includes the coupling device according to claim 1, the carrier being configured to carry a carried object.

8. A coupling device that is included in a carrier and that is configured to couple the carrier and a carried object to each other, the coupling device comprising:
   a coupling device body that includes a coupling pin,
   wherein the coupling pin projects upward from the coupling device body and is freely movable in a direction of at least one line in a horizontal plane with respect to the coupling device body,
   wherein the coupling device body includes a lifting mechanism configured to move the coupling pin upward and downward,
   wherein the lifting mechanism is fixed to a body of the carrier, and
   wherein the coupling pin is freely movable in the direction of the at least one line in the horizontal plane with respect to the lifting mechanism.

9. A coupling device that is included in a carrier and that is configured to couple the carrier and a carried object to each other, the coupling device comprising:
   a coupling device body that includes a coupling pin,
   wherein the coupling pin projects upward from the coupling device body and is freely movable in a direction of at least one line in a horizontal plane with respect to the coupling device body,
   wherein the carrier performs a forward movement in a state of being placed between a floor surface and a bottom surface of the carried object, and the carried object and the carrier are coupled to each other as a result of the coupling pin being coupled to a connected portion disposed at the bottom surface, and
   wherein the coupling pin is freely movable in a direction of one line that intersects a direction of the forward movement.

10. The coupling device according to claim 9, wherein a guide mechanism that guides the coupling pin to the connected portion is disposed at the bottom surface of the carried object, and
wherein, during coupling, the coupling pin is guided to the connected portion as a result of freely moving by receiving a force from the guide mechanism.

* * * * *